United States Patent [19]
Bhagwat et al.

[11] Patent Number: 5,437,748
[45] Date of Patent: Aug. 1, 1995

[54] PROCESS FOR PATENTING AND BRASS PLATING STEEL WIRE

[75] Inventors: Anand W. Bhagwat, Hudson; Eddie F. Riggenbach, Rootstown, both of Ohio

[73] Assignee: The Goodyear Tire & Rubber Company, Akron, Ohio

[21] Appl. No.: 306,290

[22] Filed: Sep. 15, 1994

[51] Int. Cl.$^6$ .............................................. B05D 1/18
[52] U.S. Cl. .................................. 148/532; 148/558; 134/1; 427/374.6; 427/383.7
[58] Field of Search .................. 148/522, 532, 558; 134/1; 427/120, 374.6, 383.7, 431

[56] References Cited

U.S. PATENT DOCUMENTS

| | | | |
|---|---|---|---|
| 4,763,677 | 8/1988 | Miller | 134/1 |
| 4,960,473 | 10/1990 | Kim et al. | 148/599 |
| 5,014,760 | 5/1991 | Bombeke et al. | 148/532 |

FOREIGN PATENT DOCUMENTS

| | | | |
|---|---|---|---|
| 60-46359 | 3/1985 | Japan | 148/532 |

*Primary Examiner*—George Wyszomierski
*Attorney, Agent, or Firm*—Alvin T. Rockhill

[57] ABSTRACT

It is usually desirable to utilize brass coated steel wires in the reinforcement of rubber articles, such as tires. This invention relates to a process for simultaneously parenting and brass plating a steel wire which comprises:

(a) continuously passing the steel wire through a molten mixture of copper and zinc to apply a brass coating thereto, wherein the molten mixture is maintained at a temperature which is within the range of about 930° C. to about 1100° C., and wherein the steel wire has a residence time in the molten mixture which is within the range of about 6 seconds to about 15 seconds which is sufficient for the steel to be austenitized;

(b) continuously wiping excess brass from the austenitized steel wire as it exits the molten mixture to attain a brass coated steel wire having a brass coating weight which is within the range of 2 to 8 grams of brass per kilogram of the steel wire;

(c) cooling the brass coated austenitized steel wire to a quenching temperature which is within the range of about 500° C. to 650° C. until a transformation from austenite to pearlite takes place;

(d) further cooling the patented brass plated steel wire to ambient temperature.

15 Claims, No Drawings

PROCESS FOR PATENTING AND BRASS PLATING STEEL WIRE

BACKGROUND OF THE INVENTION

It is often desirable to reinforce rubber articles, such as tires, conveyor belts, power transmission belts, timing belts, and hoses by incorporating steel reinforcing elements therein. Pneumatic vehicle tires are often reinforced with cords prepared from brass coated steel filaments. Such tire cords are generally composed of high carbon steel which is coated with a thin layer of brass. Such a tire cord can be a monofilament, but normally is prepared from several filaments which are stranded together. In most instances, depending upon the type of tire being reinforced, the strands of filaments are further cabled to form the tire cord. The typical steel for tire reinforcement usually contains about 0.65 to 0.75% carbon, 0.5 to 0.7% manganese and 0.15 to 0.3% silicon, with the balance of course being iron.

It is important for the steel alloy utilized in wires for reinforcing elements to exhibit high strength and ductility as well as high fatigue resistance. To obtain this combination of properties the steel wires are generally patented and subsequently cold drawn. The object of parenting is to impart the wire with the ability to withstand a large reduction in area during drawing so that wires having the desired high tensile strength, toughness, and fatigue resistance can be made.

Patenting is normally conducted as a continuous process and typically consists of first heating the alloy to a temperature within the range of about 850° C. to about 1150° C. to form austenite, and then cooling at a rapid rate to a lower temperature at which transformation occurs which changes the microstructure from face centered cubic to body centered cubic and which yields the desired mechanical properties. In many cases, while it is desired to form a single allotrope, a mixture of allotropes having more than one microstructure are in fact produced.

In commercial operations it is desirable for the transformation from a face centered cubic microstructure to a body centered cubic microstructure in the transformation phase of the parenting process to occur as rapidly as possible. The faster the rate of transformation, the less demanding the equipment requirements are at a given throughput. In other words, if more time is required for the transformation to occur, then the length of the transformation zone must be increased to maintain the same level of throughput. It is, of course, also possible to reduce throughputs to accommodate for the low rate of transformation by increasing the residence time in the transformation zone (soak).

In order for rubber articles which are reinforced with steel wire elements to function effectively it is imperative that good adhesion between the rubber and the steel cord be maintained. Thus, generally steel wire reinforcement elements are coated with brass in order to facilitate rubber-metal adhesion.

It is generally agreed by those skilled in the art that adhesion of rubber to brass-plated steel wire is dependent upon a bond between the copper in the brass and sulfur in the rubber. When such brass coated steel reinforcing elements are present in the rubber composition during vulcanization, it is believed that bonds between the rubber and steel reinforcement gradually form due to a chemical reaction between the brass alloy and the rubber at the interface forming a bonding layer. The brass coating also serves an important function as a lubricant during final wet drawing of steel filaments.

Over the years various techniques have been employed for coating steel filaments with brass. For instance, alloy plating has been used to plate steel filaments with brass coatings. Such alloy plating procedures involve the electrodeposition of copper and zinc simultaneously to form a homogeneous brass alloy in-situ from a plating solution containing chemically complexing species. This codeposition occurs because the complexing electrolyte provides a cathodic film in which the individual copper and zinc deposition potentials are virtually identical. Alloy plating is typically used to apply alpha-brass coatings containing about 70% copper and 30% zinc. Such coatings provide excellent draw performance and good initial adhesion. However, research in recent years has shown that long-term adhesion during the surface life of a tire depends on more than bulk coating chemistry. More specifically, the nature of the service oxide layer and the chemistry variation (gradient) across the total brass coating have proven to be important.

Sequential plating is a practical technique for applying brass alloys to steel filaments. In such a procedure a copper layer and a zinc layer are sequentially plated onto the steel filament by electrodeposition followed by a thermal diffusion step. For sequential brass plating, copper pyrophosphate and acid zinc sulfate plating solutions are usually employed.

In the standard procedure for plating brass on to steel filaments, the steel filament is first optionally rinsed in hot water at a temperature of greater than about 60° C. The steel filament is then acid pickled in sulfuric acid or hydrochloric acid to remove oxide from the surface. After a water rinse, the filament is coated with copper in a copper pyrophosphate plating solution. The filament is given a negative charge so as to act as a cathode in the plating cell. Copper plates are utilized as the anode. Oxidation of the soluble copper anodes replenishes the electrolyte with copper ions. The copper ions are, of course, reduced at the surface of the steel filament cathode to the metallic state.

The copper plated steel filament is then rinsed and plated with zinc in a zinc plating cell. The copper plated filament is given a negative charge to act as the cathode in the zinc plating cell. A solution of acid zinc sulfate is in the zinc plating cell which is equipped with a soluble zinc anode. During the zinc plating operation, the soluble zinc anode is oxidized to replenish the electrolyte with zinc ions. The zinc ions are reduced at the surface of the copper coated steel filament which acts as a cathode to provide a zinc layer thereon. The acid zinc sulfate bath can also utilize insoluble anodes when accompanied with a suitable zinc ion replenishment system. The filament is then rinsed and heated to a temperature of greater than about 450° C. and preferably within the range of about 500° C. to 550° C. to permit the copper and zinc layers to diffuse thereby forming a brass coating. This is generally accomplished by induction or resistance heating. The filament is then cooled and washed in a dilute phosphoric acid bath at room temperature to remove oxide. The brass coated filament is then rinsed and air dried at a temperature of about 75° C. to about 150° C.

SUMMARY OF THE INVENTION

The subject invention discloses a technique for simultaneously patenting and brass plating steel wires. By employing this technique the need for separate patenting and brass plating steps is eliminated. The elimination of these separate steps can, of course, lead to substantial cost savings. Additionally, the patented brass plated wires made by this process exhibit improved corrosion resistance.

This invention more specifically relates to a process for simultaneously parenting and brass plating a steel wire which comprises:

(a) continuously passing the steel wire through a molten mixture of copper and zinc to apply a brass coating thereto, wherein the molten mixture is maintained at a temperature which is within the range of about 930° C. to about 1100° C., and wherein the steel wire has a residence time in the molten mixture which is within the range of about 6 seconds to about 15 seconds which is sufficient for the steel to be austenitized;

(b) continuously wiping excess brass from the austenitized steel wire as it exits the molten mixture to attain a brass coated steel wire having a brass coating weight which is within the range of 2 to 8 grams of brass per kilogram of the steel wire;

(c) cooling the brass coated austenitized steel wire to a quenching temperature which is within the range of about 500° C. to 650° C. until a transformation from austenite to pearlite takes place;

(d) further cooling the patented brass plated steel wire to ambient temperature.

DETAILED DESCRIPTION OF THE INVENTION

The term "steel" as used in the present specification and claims refers to what is commonly known as carbon steel, which is also called high-carbon steel, ordinary steel, straight carbon steel, and plain carbon steel. An example of such a steel is American Iron and Steel Institute Grade 1070-high carbon steel (AISI 1070). Such steel owes its properties chiefly to the presence of carbon without substantial amounts of other alloying elements. U.S. Pat. No. 4,960,473 discloses some preferred steel alloys which can be utilized in this invention.

It is generally preferred for the steel wire to be cleaned and treated in a flux solution before it is passed through the molten mixture of copper and zinc. Ultrasonic cleaning techniques can be employed to remove foreign particles from the wire with excellent results. The ultrasonic cleaning is normally carried out in water or an aqueous solution of sodium hydroxide in the presence of ultrasonic waves. After the ultrasonic cleaning step it is normally preferred to pass the steel wire through an aqueous zinc chloride flux solution.

Brass is an alloy of copper and zinc which can contain other metals in varying lesser amounts. Alpha-brass which contains from about 60% to about 80% copper and from about 20% to about 40% zinc is generally used in coating filaments for reinforcing rubber articles. It is normally preferred for the brass to contain from about 62% to about 70% by weight copper and from about 30% to about 38% by weight zinc. In practicing this invention it is normally more preferred for the brass to contain from about 63% to about 65% by weight copper and from about 35% to 37% by weight zinc.

In the first step of the process of this invention the steel wire is continuously passing through a molten mixture of copper and zinc to apply the brass coating thereto. The molten mixture of copper and zinc has the composition of brass coating desired. In other words, the molten mixture of copper and zinc will contain from about 62% to about 70% by weight copper and from about 30% to about 38% by weight zinc. The molten mixture preferably contains from about 62% to about 70% by weight copper and from about 30% to about 38% by weight zinc and most preferably contains from about 63% to about 65% by weight copper and from about 35% to 37% by weight zinc.

The molten mixture is maintained at a temperature which is within the range of about 930° C. to about 100° C. It is preferred for the molten mixture to be maintained at a temperature which is within the range of about 950° C. to about 1025° C. with a temperature of which is within the range of about 960° C. to about 980° C. being most preferred. The temperature employed will be sufficient to keep the mixture of copper and zinc in the molten state and to austenitize the steel in the wire.

The steel wire has a residence time in the molten mixture which is sufficient for the steel to be austenitized. The steel is considered to be austenitized after its microstructure has been completely transformed to a homogeneous face centered cubic crystal structure. The time required for the steel to be austenitized will normally be within the range of about 6 seconds to about 15 seconds.

The precise time required for the steel in the wire to be austenitized will vary with the diameter of the wire. Naturally smaller wire requires less time and larger wire requires more time to be austenitized. For example, small wire having a diameter of about 1.0 mm requires only about 6 seconds of residence time in the molten mixture to become fully austenitized. On the other hand, thick wire having a diameter of 3.0 mm typically requires about 15 seconds to become austenitized. Wires of intermediate size having diameters of about 1.75 mm normally take about 7 to 10 seconds and more typically 8 to 9 seconds to be austenitized. The wire take-up speed and the distance which the wire travels though the molten mixture of copper and zinc will accordingly be adjusted to attain the desired residence time for the steel wire in the molten bath.

In the second step of the process of this invention excess brass is wiped from the surface of the steel wire as it exits the molten mixture of copper and zinc. Immediately after exiting the molten bath the steel wire will generally be coated with from about 7 grams to 12 grams of brass per kilogram of wire. However, the thickness of the coating will vary 10 with the speed of the wire and the angle at which it exits the molten bath. Naturally, thinner coatings are experienced at higher exit angles. Thinner coatings are also attained at slower wire speeds. In any case, the austenitized steel wire will be wiped after exiting the molten bath to attain a brass coating having a brass coating weight which is within the range of 2 to 8 grams of brass per kilogram of the steel wire. The wire will preferably be wiped to attain a brass coating having a coating weight which is within the range of 3 to 4 grams of brass per kilogram of the steel wire.

The excess brass can be wiped from the steel wire by passing it through stationary pads or rollers. The pressure applied to the wire will, of course, be adjusted to get the desired coating thickness. The pads of rollers used to wipe excess brass from the steel wire will normally be made of a soft ceramic material, such as fiber glass or glass wool. Asbestos pads could also be employed but are not preferred for environmental and safety reasons.

After the excess brass is removed from the austenitized steel wire it is cooled to a quenching temperature which is within the range of about 500° C. to about 650° C. until a transformation from austenite to pearlite takes place. The transformation from austenite to pearlite will typically begin at a temperature which is within the range of about 520° C. to about 600° C. and will more typically begin at a temperature which is within the range of about 530° C. to about 550° C.

The transformation from austenite to pearlite in the quenching step typically takes from about 0.5 seconds to about 4 seconds to complete. The transformation from austenite to pearlite will more typically take place over a time period within the range of about 1 second to about 3 seconds. The transformation is considered to begin at the point where a temperature increase due to recalescence is observed. As the transformation proceeds, the microstructure is transformed from a face centered cubic microstructure of the austenite to pearlite. The patenting procedure is considered to be completed after the transformation to pearlite has been attained wherein the pearlite is a lamellar structure consisting of an iron phase having a body centered cubic crystal structure and a carbide phase.

The quenching step will normally be carried out in an oven under an inert gas atmosphere. The inert gas will normally be a Noble gas selected from the group consisting of helium, neon, argon, krypton, and xenon. This quenching step can also be conducted under air. However, if the quenching step is carried out under an atmosphere other than an inert gas atmosphere zinc oxide will form on the surface of the steel wire and a subsequent zinc oxide removal step will be required.

After the patenting has been completed in the quenching step the brass plated steel wire is simply cooled to ambient temperature in the final step of the process of this invention. The brass plated, patented steel wire can then be drawn to produce high strength filaments which exhibit high ductility and high fatigue resistance. The brass plated, patented wires made by the process of this invention also exhibit corrosion resistance which is greatly improved over that observed in steel wires which are brass plated and patented utilizing conventional techniques.

The present invention will be described in more detail in the following examples. These examples are merely for the purpose of illustration and are not to be regarded as limiting the scope of the invention or the manner in which it may be practiced. Unless specifically indicated otherwise, all parts and percentages are given by weight.

EXAMPLE

In this experiment, a steel wire having a diameter of 1.78 mm was simultaneously patented and brass plated utilizing the technique of this invention. In the procedure used ultrasonic cleaning was employed to remove foreign particles from the surface of the steel wire and the wire was then passed through a zinc chloride flux solution. The cleaned steel wire was then passed through a molten brass bath which contained 64 percent by weight copper and 36 percent by weight zinc. The molten brass was maintained at a temperature of 980° C. to 1035° C. in a 200 pound (91 kg) crucible furnace. The steel wire had a immersion time in the molten brass of 10–15 seconds which was followed by air cooling. Utilizing this technique 50 meters of wire was simultaneously patented and brass plated.

Testing showed that the parenting and brass plating were both highly successful. Electron microscopy showed excellent adhesion between the brass coating and the steel wire. It also showed complete coverage of surface irregularities. At a magnification of 5000× the microstructure proved to be predominantly pearlite with few patches of bainite which was evidence of good patenting.

Physical testing showed the patented steel wire to have a tensile strength of 1180 MPa, an elongation of 9.05%, and a reduction area of 57.82%. The bright wire had a tensile strength of 2036 MPa, an elongation of 4.32%, and a reduction area of 54.04%. Thus, the steel wire was clearly well patented utilizing the technique of this invention.

The brass plated steel wire also proved to have improved corrosion resistance over a control wire which was patented and brass plated utilizing conventional procedures. This was determined by comparing the alternating current electrical impedance of the two wires in a corrosive bath. The control wire showed a resistance polarization of 2008 Ohms and the wire which was plated and patented in accordance with the technique of this invention showed a resistance polarization of 2805 Ohms.

While certain representative embodiments and details have been shown for the purpose of illustrating this invention, it will be apparent to those skilled in this art that various changes and modifications can be made herein without departing from the scope of this invention.

What is claimed is:

1. A process for simultaneously parenting and brass plating a steel wire which comprises:
   (a) continuously passing the steel wire through a molten mixture of copper and zinc to apply a brass coating thereto, wherein the molten mixture is maintained at a temperature which is within the range of about 930° C. to about 1100° C., and wherein the steel wire has a residence time in the molten mixture which is within the range of about 6 seconds to about 15 seconds which is sufficient for the steel to be austenitized;
   (b) continuously wiping excess brass from the austenitized steel wire as it exits the molten mixture to attain a brass coated steel wire having a brass coating weight which is within the range of 2 to 8 grams of brass per kilogram of the steel wire;
   (c) cooling the brass coated austenitized steel wire to a quenching temperature which is within the range of about 500° C. to 650° C. until a transformation from austenite to pearlite takes place thereby producing a patented brass plated steel wire;
   (d) further cooling the patented brass plated steel wire to ambient temperature.

2. A process as specified in claim 1 wherein the molten mixture contains from about 60 weight percent to about 80 weight percent copper and from about 20 weight percent to about 40 weight percent zinc.

3. A process as specified in claim 2 wherein the molten mixture is maintained at a temperature which is within the range of about 950° C. to about 1025° C.

4. A process as specified in claim 3 wherein the steel wire has a residence time in the molten mixture which is within the range of about 7 seconds to about 10 seconds.

5. A process as specified in claim 3 wherein excess brass is wiped from the austenitized steel wire in step (b) to attain a brass coated steel wire having a brass coating weight which is within the range of 3 to 4 grams of brass per kilogram of the steel wire.

6. A process as specified in claim 5 wherein the molten mixture contains from about 63 weight percent to about 65 weight percent by weight copper and from about 35 weight percent to about 37 weight percent by weight zinc.

7. A process as specified in claim 3 wherein the molten mixture contains from about 62 weight percent to about 70 weight percent by weight copper and from about 30 weight percent to about 38 weight percent by weight zinc.

8. A process as specified in claim 7 wherein the molten mixture is maintained at a temperature which is within the range of about 960° C. to about 980° C.

9. A process as specified in claim 3 wherein the quenching temperature utilized in step (c) is within the range of about 520° C. to about 600° C.

10. A process as specified in claim 9 wherein the transformation from austenite to pearlite in step (c) takes place in about 0.5 seconds to about 4 seconds.

11. A process as specified in claim 3 further comprising a step of cleaning the steel wire by ultrasonic cleaning prior to passing the steel wire through the molten mixture in step (a).

12. A process as specified in claim 11 wherein the transformation of the steel from austenite to pearlite is conducted under an inert gas atmosphere.

13. A process as specified in claim 12 wherein the inert gas atmosphere is selected from the group consisting of helium, neon, argon, krypton, and xenon.

14. A process as specified in claim 3 wherein the quenching temperature utilized in step (c) is within the range of about 530° C. to about 550° C.

15. A process as specified in claim 14 wherein the transformation from austenite to pearlite in step (c) takes place in about 1 second to about 3 seconds.

* * * * *